H. B. BAGG.
BEAM LOCK FOR SCALES.
APPLICATION FILED AUG. 7, 1918.

1,323,387.

Patented Dec. 2, 1919.

Inventor:
Hollis B. Bagg
by his Attys:
Phillips, Sampy, Rice & Kennedy

UNITED STATES PATENT OFFICE.

HOLLIS B. BAGG, OF WATERTOWN, CONNECTICUT, ASSIGNOR TO SCOVILL MANUFACTURING COMPANY, A CORPORATION OF CONNECTICUT.

BEAM-LOCK FOR SCALES.

1,323,387.  Specification of Letters Patent.  Patented Dec. 2, 1919.

Application filed August 7, 1918. Serial No. 248,678.

*To all whom it may concern:*

Be it known that I, HOLLIS B. BAGG, a citizen of the United States, residing at Watertown, county of Litchfield, and State of Connecticut, have invented certain new and useful Improvements in Beam-Locks for Scales, fully described and represented in the following specification and the accompanying drawings, forming a part of the same.

This invention relates to certain improvements in beam locks for beam scales.

In beam scales, as ordinarily constructed, the tip of the beam moves in a trig loop, and the trig loop is provided with a swinging block which can be operated to lock the beam down against the bottom face of the trig loop. In using such scales, the operator ordinarily allows the beam to remain locked until the load is on the scale. After the load is in position, he sets the poise at what he estimates to be the correct weighing position and releases the trig loop locking block. Even if he has accurately set the poise in its proper weighing position, the beam necessarily will have a period of oscillation before it comes to rest, indicating that the poise is properly set. This period of oscillation, of course, takes time and delays the determination of the weight, this delay being of considerable importance where a scale is being more or less constantly used and successive loads are to be rapidly weighed. If the operator does not set the poise accurately in the first instance, the period of delay is liable to be increased.

The present invention has for its object to provide a simple, inexpensive and easily operated means for so locking the beam of a beam scale as to avoid an undue period of oscillation of the beam, whereby the rapidity with which the loads may be weighed is materially increased.

With this and other objects not specifically referred to in view, the invention consists in certain constructions and in certain parts, improvements and combinations as will be hereinafter fully described and then specifically pointed out.

Referring to the drawing.

Figure 1:
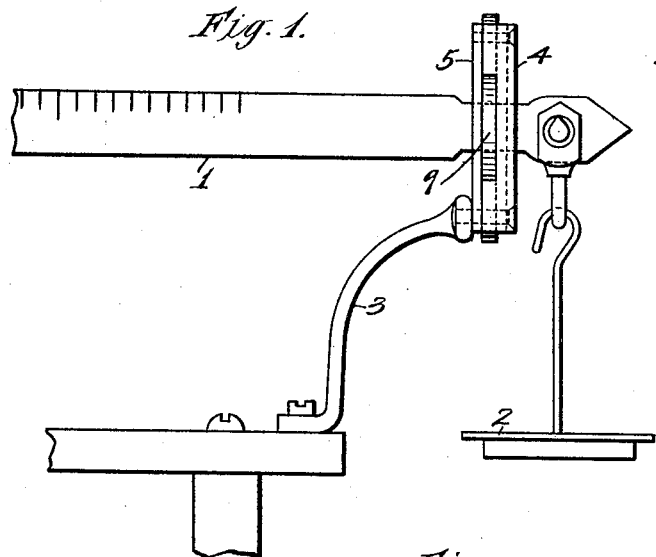
Figure 1 is a side elevation of so much of a beam scale having one form of the improved locking construction attached thereto, as is necessary for an understanding of the invention.
Figure 2:
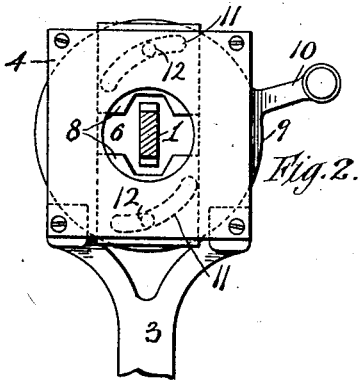
Fig. 2 is a front view of the construction shown in Fig. 1, the beam being shown in section.
Figure 5:
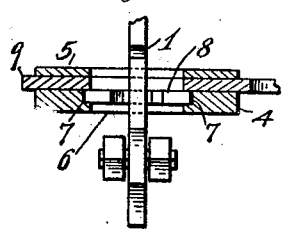
Figure 4:
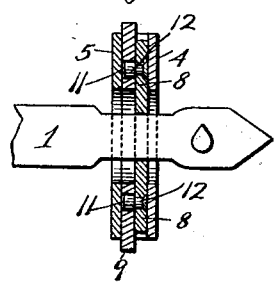
Figure 3:
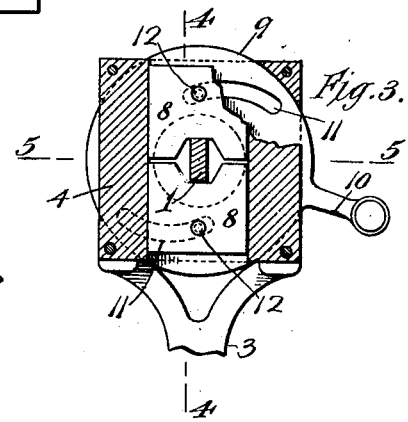
Fig. 3 is a section of the construction shown in Fig. 2, certain parts being broken away.

Figs. 4 and 5 are sections on the lines 4—4 and 5—5 respectively of Fig. 3.

Figure 6:
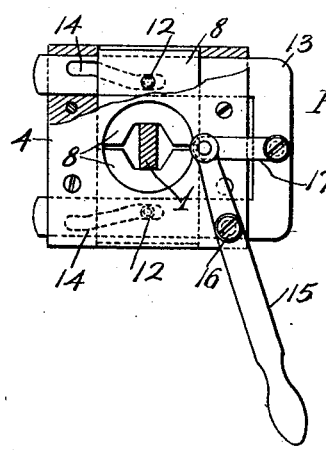

Fig. 6 illustrates a modified construction exhibiting the invention.

Referring to the drawing, 1 indicates the beam of a usual construction of beam scale, this beam being mounted in any usual way. The counterpoise is indicated at 2. In carrying the invention into effect, means will be provided for locking the beam in its balanced position, that is the position which it normally occupies when it is at rest and when there is no load on the scale. While the means employed for locking the beam in the balanced position referred to may be varied, constructions embodying the invention will usually include a plurality of locking devices which may be brought into engagement with the beam when it is in its balanced position, so as to hold it there while the load is being placed on the scale. The particular construction of locking devices employed may be varied, and the means for operating them may be varied. In the construction illustrated in Figs. 1 to 5 inclusive, the frame of the scale is provided with a bracket 3 which supports a pair of spaced plates 4, 5, these plates being provided with registering openings 6 through which the tip of the beam projects. As illustrated, the front plate 4 is provided with guides 7 in which locking blocks 8 are mounted to slide. When sliding locking blocks are employed, the movement of these blocks to engage them with and disengage them from the beam may be accomplished in various ways.

In the construction shown in Figs. 1 to 5 inclusive, a plate 9 is provided, this plate having an operating handle 10 and being mounted to rotate between the plates 4, 5. This plate is provided with cam slots 11 engaging pins 12 mounted on the blocks 8. In the construction shown in Fig. 6, the sliding blocks 8 are employed, but the rotating plate 9 is replaced by a U-shaped slide 13, the upper and lower legs of this slide having cam slots 14 which engage the pins 12 on the sliding blocks. This slide 13 is operated by a lever 15 pivoted at 16 to the front plate and connected by a link 17 to the slide. In all the constructions referred to, the parts are so arranged that the locking devices come into engagement with the beam and into locking position when the beam is at rest in its position of equilibrium. Under these conditions, a load having been placed on the scale, and the operator having set his poise to what he judges to be the correct position the lock is released. If the poise is accurately set there will be no oscillating movement of the beam and the beam may be immediately relocked in its position of equilibrium, the load removed and a succeeding load placed thereon. If the poise is not accurately set, the beam will move either up or down, as the case may be, and the operator is immediately informed by the movement in which direction to move the poise to properly weigh the load.

It may be said that it is important in employing constructions embodying the invention to so construct the locking means that the lock may gradually move out of locking position so as to control the oscillating movement of the beam within desired limits, because, if movement of the poise is required, it can be more rapidly set to the proper position if the initial movement of the beam is a limited one. The constructions illustrated in Figs. 1 to 6 are well adapted to enable this desirable gradual release of the locking means to be effected.

It will be understood that changes and variations may be made in the constructions herein shown and described for carrying the invention into effect. The invention is not, therefore, to be limited to the particular constructions shown and described.

What is claimed is:—

1. In a beam scale, the combination with the beam, of a plurality of locking blocks mounted to slide with respect to the beam and to hold it in balanced position, and means for effecting the sliding movement of the blocks into and out of engagement with the beam to hold the same in balanced position.

2. In a beam scale, the combination with the beam, of a plurality of locking blocks mounted to slide with respect to the beam and to hold it in balanced position and means including a cam mechanism for effecting the sliding movement of the blocks into and out of engagement with the beam to hold the same in balanced position.

In testimony whereof, I have hereunto set my hand.

HOLLIS B. BAGG.